July 15, 1969 R. S. JOYCE ETAL 3,455,820
CARBON TREATMENT OF RAW SEWAGE
Filed May 5, 1967
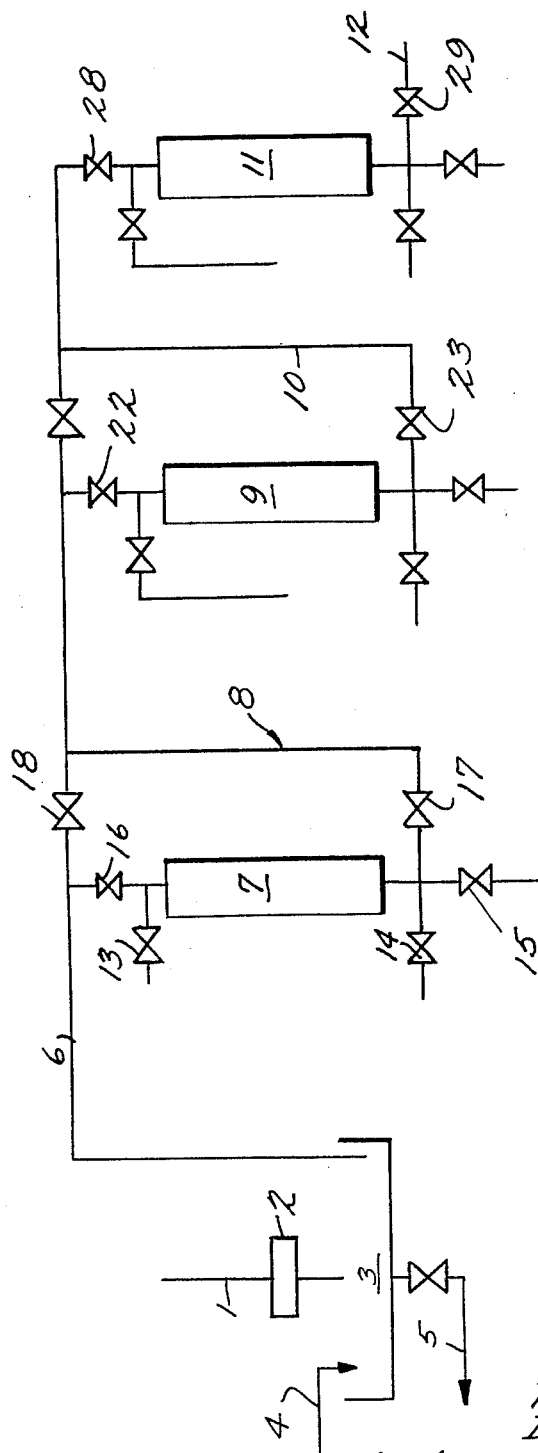
INVENTORS
RONALD S. JOYCE
DONALD G. HAGER
Cushman, Darby & Cushman
ATTORNEYS

United States Patent Office 3,455,820
Patented July 15, 1969

3,455,820
CARBON TREATMENT OF RAW SEWAGE
Ronald S. Joyce and Donald G. Hager, Pittsburgh, Pa., assignors, by mesne assignments, to Calgon Corporation, a corporation of Delaware
Filed May 5, 1967, Ser. No. 636,298
Int. Cl. C02c 1/22
U.S. Cl. 210—40                                    4 Claims

ABSTRACT OF THE DISCLOSURE

This invention provides a process for purifying sewage. The sewage is screened, treated with a flocculant, and allowed to settle; thereafter, the supernatant of the settling step is passed through at least one bed of activated carbon, the beds of activated carbon being periodically backwashed and regenerated.

BACKGROUND OF THE INVENTION

This invention relates to the treatment of sewage and more particularly, to an activated carbon treatment of raw sewage derived from a combination of household and industrial waste.

With the rapid increase in population and industrialization of urban centers, the volume of sewage that must be treated and disposed has become increasingly great. Rivers and streams, traditionally used for the disposal of either sewage or the effluent of sewage treatment plants, have been overtaxed by this increase in sewage, bringing them to a polluted condition.

Presently the most common method of treating sewage consists of a settling step where a large portion of the solids of raw sewage is removed with or without the aid of flocculants. In a significant number of sewage treating plants, a further biological treating step such as aeration is performed to further break down solids by bacterial action. The effluent of the biological treating step is then passed into rivers or streams with or without further purification.

More recently, it has been suggested to treat the effluent from the biological treating step with activated carbon for final purification. Of course, many variations of such proposals are possible. United States Patent 3,171,802 to Rice et al. discloses a process where effluent from a sewage treatment operation is passed through sand filters to remove solids and finally through beds of activated carbon for final purification. Sewage is treated in a similar manner according to United States Patent 3,171,804 to Rice.

It has also been suggested to add activated carbon to raw sewage in the settling step along with flocculants and the like to enhance the settling of solids. (See United States Patent 3,142,638 to Blaisdell.)

In United States Patent 3,244,621 to Bouthilet there is disclosed a process for treating industrial waste, such as waste water for dairies, pulp mills, canneries, wineries and oil refineries, by flowing the waste water upwardly through a moving bed of activated carbon where the carbon has a higher specific gravity than that of the waste water.

It will be appreciated that any process for treating sewage derived from the households and industries of a city or town must be capable of handling a large and variable flow at a low cost. Hence, the treatment of flocculated and aerated sewage with a further purification means such as activated carbon merely adds to the cost of sewage treatment. Furthermore, activated carbon is a comparatively expensive materials for use in sewage treatment and must be recovered for regeneration in order to be practical.

It is, therefore, an object of the present invention to provide a process whereby activated carbon may be used in a manner that is economically practical for treating sewage and which will provide an effluent that is low in contaminants. A further object is to provide a process whereby the effluent from sewage treatment is sufficiently pure as to be suitable for processing in a conventional city water treating plant and thereby not lost as source of water for human consumption. Other objects will be apparent from the following disclosures and claims.

SUMMARY OF THE INVENTION

Briefly stated, the present invention comprises treating raw sewage with a flocculant to cause separation of solids from the liquid, separating the effluent (supernate) from the flocculated solids, passing the effluent through at least one bed of activated carbon, and periodically backwashing and regenerating the activated carbon.

For the purpose of this specification and claims the terms used herein are defined as follows:

(1) Raw sewage: a dilute aqueous mixture of wastes mainly from households and some light industries that is conveniently and economically carried away by water containing a wide variety of materials, including human waste, soaps, detergents, soil, paper, food scraps, chemicals, lint, etc.;

(2) Primary effluent: the effluent from a prior treatment of raw sewage where a substantial amount of the suspended and/or dissolved solids have been removed or otherwise partially purified;

(3) Secondary effluent: the effluent from a secondary sewage treatment where a substantial amount of the suspended and/or dissolved solids have been removed by a purification step;

(4) Flocculant: a material capable upon addition to sewage of producing a floc and resulting in a more rapid separation of solids therefrom;

(5) Biochemical oxygen demand (BOD): the quantity of oxygen utilized in the biochemical oxidation of organic matter in five days at 20° C.

(6) Activated carbon: a carbonaceous material having minute pores and an increased surface area;

(7) Chemical oxygen demand (COD): the quantity of oxygen, expressed in p.p.m., consumed under specific conditions, in the oxidation of the organic and oxidizable inorganics contained in water and waste water, corrected for the influence of chlorides. (See: Methods for the Examination of Water and Waste Water, 12 Ed., Public Health Assoc., New York, N.Y., 1965 (pp. 510–514).)

Any of the common known flocculants are suitable for use with the present process, and include organic and inorganic materials. For example, there may be used anionic, cationic or nonionic polyelectrolytes. Suitable polymeric flocculants are (1) cellulose derivatives as hydroxyalkyl cellulose, carboxyalkyl cellulose, sulfoalkyl cellulose, alkyl cellulose and salts thereof, (2) the water soluble quaternary ammonium salt resulting from the reaction between polyvinyl pyridine (which may be copolymerized with other materials such as styrene) and butyl bromide, (3) the water soluble quaternary ammonium salts resulting from the reaction of a primary diamine such as propylene diamine, an alkyl halide such as 1-, 4-dichlorbutane, and a halogenated alkyl compound such as butyl bromide, (4) salts of polyvinylamide, such as the acetate, (5) the water soluble formaldehyde reaction products of guanidine carbonate, or of certain substituted guanidine salts such as amino-guanidine carbonate, (6) salts of polyethylene imine, such as the acetate or sulfate, (7) salts of long chain polymeric secondary amines such as are formed by the reaction of 1-, 4-dibromobutane and 1-6 hexamethylene diamine, (8) salts such as the chloride or acetate of mixed primary and secondary amines such as triethyene-tetramine or tetraethylene-pentamine, (9) sulfonated linear polymers of styrene and substituted styrene or copolymers thereof with acrylic monomers, (10) polyethylene oxides, (11) salts of polyacrylates, (12) dialkylaminoalkyl acrylates and the quaternary compounds thereof, (13) vinyl-benzyl-quaternary-ammonium compounds and the copolymers with acrylates, (14) half-amides of olefinic anhydrides copolymerized with olefins, (15) polyalkylenimines and polymeric condensates of polyalkylene-polyamines and vicinal dihaloalkanes, (16) homopolymers and interpolymers of alpha-ethylenically unsaturated sulfines, (17) polyacroleins treated with a strong base, (18) polymerized products of polysaccharides or derivatives thereof and urea or melamine resins, (19) natural gums, (20) ammonium and alkali metal lignosulfonates, and (21) hydrolyzed and unhydrolyzed polyacrylamides. Also, there may be used inorganic materials such as aluminum sulphate, copper sulphate, ferric chloride, ferric sulphate, ferrous sulphate, and lime. The above list of flocculants is not to be construed as limiting the useful flocculants, but merely as examples. For other flocculants suitable for use in this process, see United States Patents 2,264,448, 2,738,724, 2,995,512, 3,009,873, 3,014,896, 3,020,229, 3,023,162, 3,055,827, 3,142,638, 3,157,595, 3,171,802, 3,171,804, 3,171,805, 3,210,308, 3,214,370, 3,244,621, 3,235,493, 3,252,899, 3,285,849, 3,288,707, which disclosures are hereby incorporated by reference.

It may also be desirable to include flocculating aids such as montmorillonites, attapulgite, Wyoming bentonite, calcium bentonite, bentones and bauxite. Many other such aids are known to the art, and additional suitable acids are disclosed in the above-listed United States patents.

As noted above, any of the known flocculants and aids therefor may be used according to the present invention. The choice of the particular flocculant and aid will depend on the particular sewage being treated. Since sewage will vary with different locations and even with the time of day and day of the week within a single location, the choice of flocculants and aids will correspondingly vary. The choice of a flocculant and aid is, however, well within the skill of the art.

The process of the invention will be further described with reference to the accompanying drawing wherein there is shown a schematic flow diagram of apparatus suitable for use with the process of the present invention.

Referring to the drawing, the raw sewage 1 is passed through a conventional bar screening device 2 where large solids are removed and passed into flocculating tank 3. Flocculants with or without aids are added to the sewage via 4. Flocculating tank 3 is provided with a bottom drain 5 for periodically removing the flocculated solids. The clarified supernate effluent is passed via 6 to column 7, and via 8 to column 9 and via 10 to column 11. The purified effluent is then passed to storage via 12. Columns 7, 9 and 11 contain activated carbon. While the present process is illustrated with three activated carbon columns, it will be understood that only one column, or four or more columns, may be used. At least two columns are preferred, however, so that at least one column may be backwashed and/or regenerated while at least one other column is in operation, as later explained. When the columns are being operated serially, valves 16, 17, 22, 23, 28 and 29 are open, the remaining valves being closed. In practice, however, at least one column will not usually be in operation. For example, if column 7 is to be out of operation, valves 16 and 17 would be closed and valve 18 opened, the remaining valves in position as described above. Periodically, it will be necessary to backwash the columns to remove solids that have been filtered out of the effluent leaving tank 3. If, for example, column 7 is to be backwashed, it is taken out of operation as described above and water flowed via opened valve 14 through column 7 and discharged via opened valve 13 until the activated carbon in column 7 is sufficiently flushed. Similarly, when the activated carbon in a column requires regeneration to remove the absorbed solids, the column is taken out of operation and valved appropriately. For example, if column 7 is to be regenerated, the column is taken out of operation and water flowed via opened valve 13 into column 7 whereby the activated carbon is slurried and removed via opened valve 15. The slurried carbon is then sent to a conventional regeneration furnace (not shown) and subsequently returned to the process for further use. The column may be backwashed as described above prior to removing the activated carbon for regeneration. Columns 9 and 11 are operated in the same manner as column 7 when being backwashed or when the activated carbon is to be removed. While the invention has been illustrated in connection with the particular apparatus described above, it is apparent that other arrangements could equally serve to carry out the present process and that the invention is not limited to use with any particular apparatus.

Referring to the process in detail, the raw sewage is screened to remove large solid materials. A conventional bar screen is suitable for this purpose. Raw sewage normally will contain solid material in the range of 50 to 1000 p.p.m., as determined by filtration, and have a BOD of between 50 and 800, and a COD of between 50 and 2000. However, it is to be recognized that raw sewage outside of these recited ranges may be processed according to the present invention. The amount of flocculating agent necessary to clarify the raw sewage will vary with the solids content thereof, but will generally be between .01 to 600 p.p.m. Since the activated carbon functions as both a filter and adsorbent for purifying the effluent of the clarifying step, the amount of solids that must be removed by the activated carbon should be kept as low as practical. In any case, the solids content must be below about 100 p.p.m. of suspended solids. When the solids content substantially exceeds this amount it has been found that the activated carbon rapidly becomes inefficient. Therefore, the flocculants and aids chosen for a particular raw sewage must be able to reduce the solids content to below 100 p.p.m.

It will be appreciated from the above that the activated carbon of the present process has a dual function; it acts as a filter for removing suspended solids and as an adsorbent for removing dissolved solids. Therefore, it is essential that a backwashing step be performed periodically to remove the filtered solids, and generally speaking a number of backwashings will be performed for every carbon regeneration required. A backwashing will be necessary when the pressure drop across the activated carbon begins to rise sharply, indicating that the filtered solids are beginning to seriously restrict the flow of liquid in the column. Of course, the activated carbon must be regenerated when the amount of dissolved solids adsorbed by the activated carbon reaches such a proportion that the efficiency of the activated carbon is seriously reduced. The regeneration of activated carbon is well known in the art and any of the conventional processes and apparatus for use therewith are suitable for the present process.

While any activated carbon may be used in the present process, it has been found that certain types of activated carbon are superior in efficiency and the degree of purity of the treated effluent. Preferably, the activated carbon should have a surface area between about 300 to 1500 $M^2/gr.$, as determined by the Brunauer-Emmett-Teller method. (See Journal of the American Chemical Society, vol. 60, page 309, 1938.) While both powdered activated carbon or granular carbon may be used, the preferred material is in granular form and will generally have a mesh size of at least 50, that is, it will be retained in a 50 mesh screen. (U.S. Std. Sieve)

The flocculating tank used in the clarification step may or may not be stirred. However, it has been found that a more rapid clarification can be effected by initially stirring the sewage and flocculant until precipitation begins to proceed rapidly, and thereafter allowing the precipitation to continue without further stirring.

While the amount of activated carbon necessary to reduce the dissolved solids to an acceptable level will vary depending on the sewage being treated, in general from 0.1 to 3 lbs. of activated carbon per 1000 gallons of sewage treated will be necessary. However, the amount of activated carbon used may be outside of this range and the proper amount may be easily determined by simple tests.

The invention is illustrated but not limited by the following examples.

Example 1

Raw sewage was obtained from a sewage treatment plant serving mainly households and some light industry. The sewage was clarified by the addition of lime (CaO) and an anionic synthetic polyelectrolyte designated as aid 230, Calgon Corporation. This polyelectrolyte is a hydrolized polyacrylamide. The lime and aid 230 were added with stirring until the concentration of lime was 400 p.p.m. and the concentration of aid 230 was 0.25 p.p.m. After the solids began to rapidly flocculate, the stirring was discontinued and the floc allowed to settle. The supernatant was separated from the floc and passed through a column of activated carbon. The carbon designated as Calgon Filtrasorb 300 having a surface area of between 950 and 1100 $M^2/g.$ was in granular form and had a mesh size of 8 x 30 U.S. Std. Sieve. The column was one inch in diameter and 27 inches long and contained 150 grams of activated carbon. A flow rate of 2 ml./min. was used. The clarified liquid entering the column had a COD value of 84 and the liquid collected after passing through the column had a COD value of 2.8.

Example 2

The procedure of Example 1 was repeated with another sample of sewage. The liquid entering the column had a COD value of 108, and a COD value of 25 after passing through the column.

Example 3

The procedure of Example 1 was repeated with another sample of sewage. The liquid entering the column had a COD value of 90, and a COD value of 1.5 after passing through the column.

Example 4

The procedure of Example 1 was repeated and the flow through the column was continued until the COD values of the liquid passed through the column began to rise sharply. The carbon was removed from the column and the percent of dissolved solids adsorbed by the carbon was determined to be 40 weight percent.

Example 5

In order to further test the process of this invention, a small pilot plant was constructed at the site of a conventional sewage treatment plant. This pilot plant was used to ascertain how well the present process would function under actual field conditions. A 1 g.p.m. slip stream of raw sewage was pumped from the wet well. Prior to entering the wet well, the sewage had passed through a conventional comminutor and bar screen. The slip stream was treated continuously with 20–50 p.p.m. of alum and 10–14 p.p.m. of a homopolymer of dimethyl diallyl ammonium chloride. The chemicals were admixed with the sewage in a flash mixer in which the retention time was about 55 minutes. In this tank a paddle stirrer was rotated at 14 r.p.m. The flocculated sewage passed to a settling tank where the retention time was 90 minutes. Although separate mixing, flocculation and settling tanks were used in the pilot plant equipment, for the convenience of the experiment, it should be noted that separate tanks would not be necessary in a full-scale plant.

A stream of the effluent from the settling tank was then pumped through a series of 2-inch I.D. Pyrex pipe columns containing Filtrasorb 300 having a surface area of 950–1100 $M^2/g.$ mesh, at a flow rate of 380 ml./min., corresponding to 4 g.p.m./sq. ft. (cross sectional bed area). The total depth of the carbon beds was 20 feet. Samples of the influent and the effluent from the various process steps were collected at regular intervals. The test was continued over a period of several months and a total of 11,000 gallons of settled sewage was passed through the carbon beds.

The results obtained are shown in table.

TABLE

|  | Raw | Coagulated and settled | Activated carbon treated |
|---|---|---|---|
| COD, p.p.m. | 90–800 Av. 400 | 40–180 Av. 110 | 4–20 Av. 13 |
| BOD, p.p.m. | 63–287 Av. 127 | 15–75 Av. 25 | 1–7 Av. 4 |
| Suspended solids, p.p.m. | 50–700 Av. 250 | 25–75 Av. 45 |  |

From the above examples, it can be seen that the present process provides a simple and efficient means of clarifying and purifying sewage. The process requires a minimum of equipment and is easy to operate.

Having described and illustrated the invention, it will be apparent to those skilled in the art that the invention permits of modification in arrangement and details, and that such modifications may be made within the scope of the following claims without departing from the spirit of the invention.

What is claimed is:

1. A process for the separation of water from sewage derived mainly from households which contain in aqueous suspension human waste, soaps, detergents, soil, paper, food scraps and the like consisting essentially of screening the sewage and thereafter removing suspended solid, treating the screened raw sewage with a polyelectrolyte flocculant and forming a floc, settling the floc and separating the floc from a supernatant containing less than 100 p.p.m. of suspended solids, passing said supernatant through at least one bed of activated carbon, having a surface area between 300 and 1500 $M^2/g.$ and containing no more than 40% of adsorbed solids, and periodically backwashing and regenerating the activated carbon.

2. The process of claim 1 wherein the activated carbon is in granular form.

3. The process of claim 1 wherein at least two beds of activated carbon are used.

4. The process of claim 1 where the activated carbon is used in the process until it contains approximately 40% of adsorbed solids; and the activated carbon is thereafter regenerated.

References Cited

UNITED STATES PATENTS

| 3,171,802 | 3/1965 | Rice et al. | 210—53 X |
| 3,171,804 | 3/1965 | Rice | 210—53 |
| 3,244,621 | 4/1966 | Bouthilet | 210—39 X |
| 3,337,454 | 8/1967 | Gruenwald | 210—51 |
| 3,142,638 | 7/1964 | Blaisdell et al | 210—52 |

MICHAEL E. ROGERS, Primary Examiner

U.S. Cl. X.R.

210—54, 80